United States Patent
Soluri et al.

(10) Patent No.: US 7,928,396 B2
(45) Date of Patent: Apr. 19, 2011

(54) METHOD FOR OBTAINING A SCINTILLATION STRUCTURE

(75) Inventors: Alessandro Soluri, Rome (IT); Roberto Massari, Rome (IT); Carlo Trotta, Rome (IT); Francesco Scopinaro, Rome (IT)

(73) Assignee: Consiglio Nazionale delle Ricerche (CNR), Rome (IT)

( * ) Notice: Subject to any disclaimer, the term of this patent is extended or adjusted under 35 U.S.C. 154(b) by 0 days.

(21) Appl. No.: 12/189,818

(22) Filed: Aug. 12, 2008

(65) Prior Publication Data

US 2009/0242838 A1    Oct. 1, 2009

(30) Foreign Application Priority Data

Mar. 28, 2008   (IT) .............................. RM2008A0169
Jul. 18, 2008   (WO) .................. PCT/IT2008/000484

(51) Int. Cl.
  *G01T 1/20*   (2006.01)
(52) U.S. Cl. ................. 250/361 R; 250/362; 250/363.1; 250/370.11; 250/484.4

(58) Field of Classification Search .............. 250/361 R, 250/362, 363.1, 370.11, 483.1, 484.2, 484.4
See application file for complete search history.

(56) References Cited

U.S. PATENT DOCUMENTS

| | | | |
|---|---|---|---|
| 4,914,301 A * | 4/1990 | Akai ......................... | 250/370.01 |
| 5,548,123 A * | 8/1996 | Perez-Mendez et al. | 250/370.11 |
| 6,393,092 B1 * | 5/2002 | Yoshida .......................... | 378/19 |
| 6,553,092 B1 * | 4/2003 | Mattson et al. ................. | 378/19 |
| 2003/0127600 A1 * | 7/2003 | Vafi et al. ................. | 250/370.11 |
| 2003/0178570 A1 * | 9/2003 | Tsunota et al. ........... | 250/370.11 |
| 2005/0017182 A1 * | 1/2005 | Joung et al. ................ | 250/363.1 |
| 2005/0129171 A1 * | 6/2005 | Jiang et al. ..................... | 378/19 |
| 2006/0033032 A1 * | 2/2006 | Inoue et al. .............. | 250/370.11 |

\* cited by examiner

*Primary Examiner* — David P Porta
*Assistant Examiner* — Casey Bryant
(74) *Attorney, Agent, or Firm* — Young & Thompson

(57) ABSTRACT

A method for obtaining a scintillation body comprising the steps of readying a matrix of binding material within which is present a plurality of scintillation crystals, obtaining a plurality of channels within the matrix and around the crystals and inserting metallic material having a high atomic number and high density between mutually adjacent scintillation crystals without separating the scintillation crystals from the matrix of binding material.

16 Claims, 8 Drawing Sheets

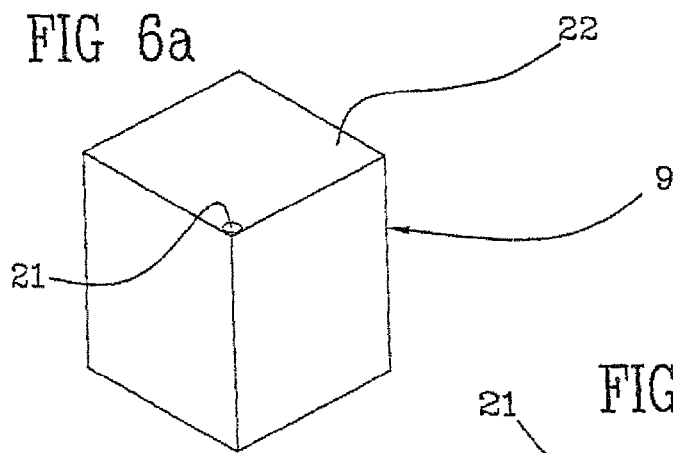
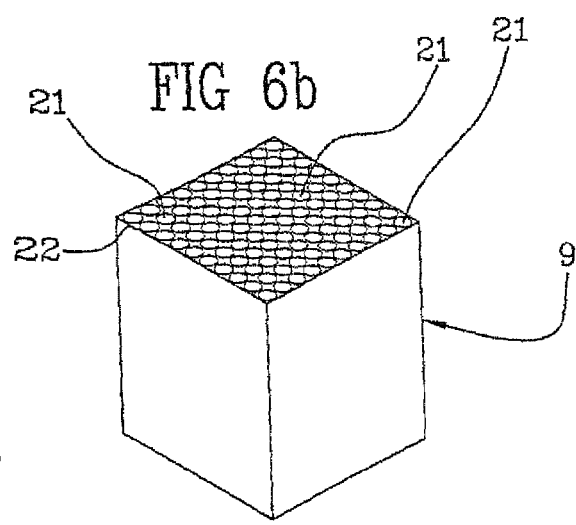
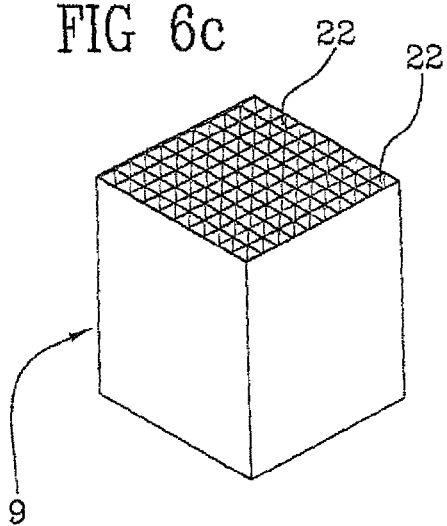
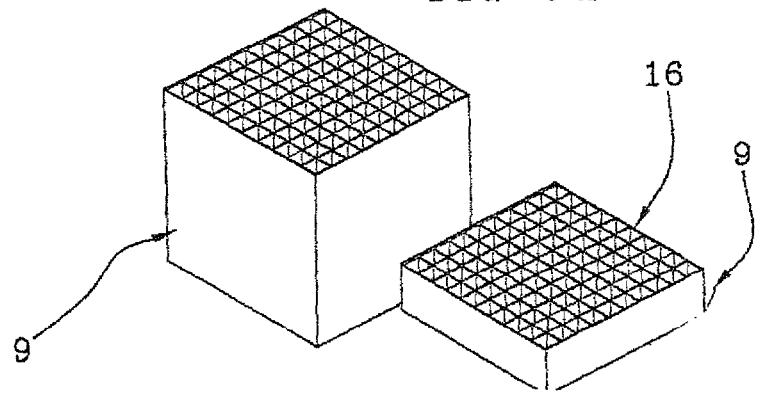

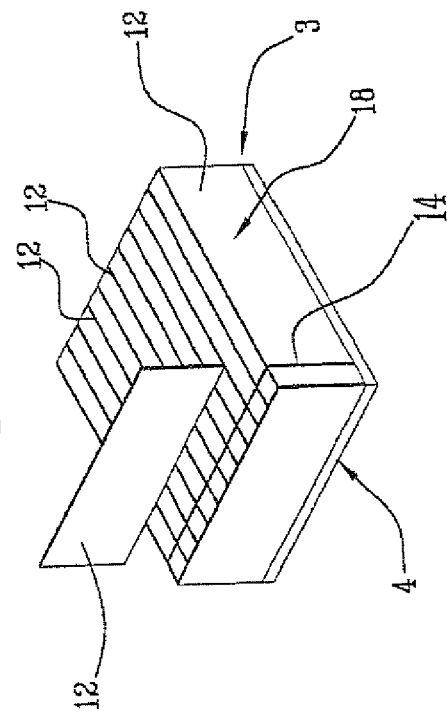
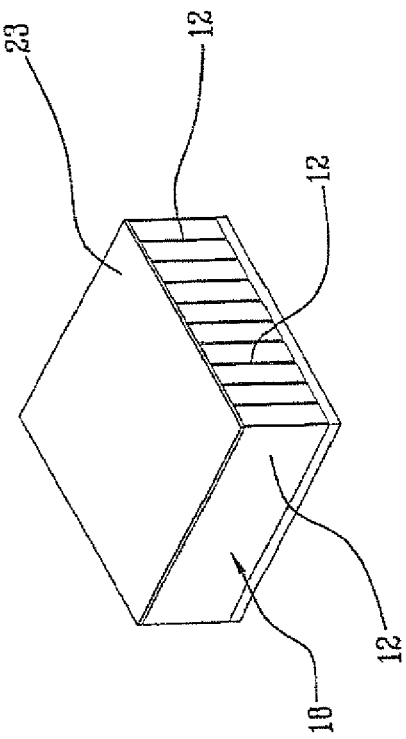
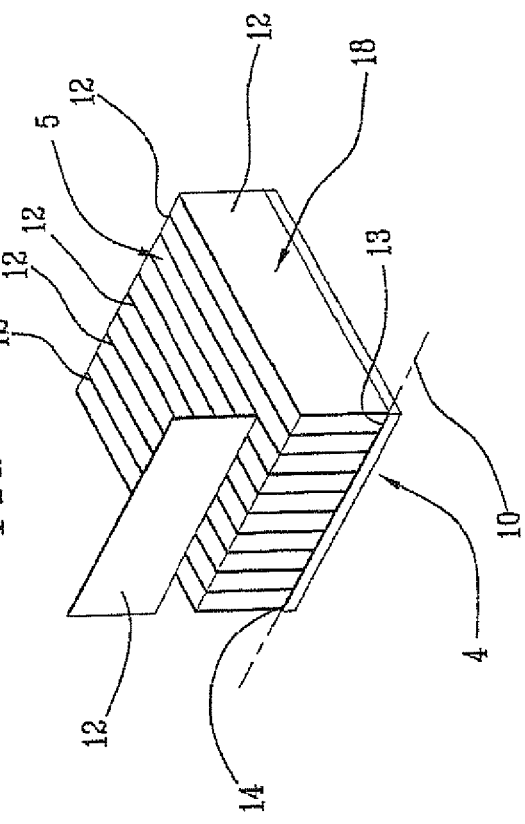
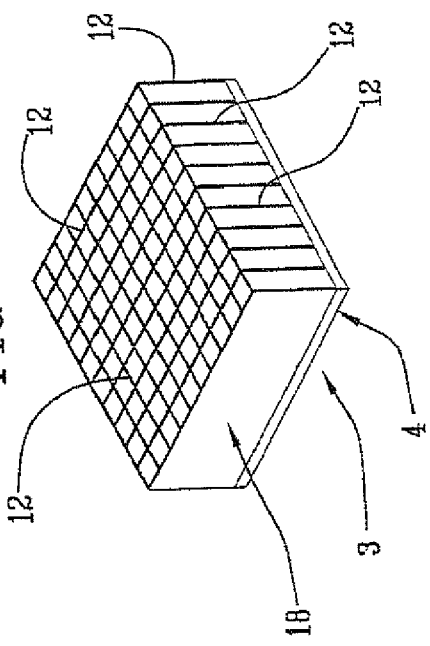

US 7,928,396 B2

METHOD FOR OBTAINING A SCINTILLATION STRUCTURE

TECHNICAL FIELD

The present invention relates to a method for obtaining a scintillation structure of the type used in gamma cameras.

BACKGROUND OF INVENTION

The gamma camera is substantially constituted by three fundamental elements: a collimator a scintillation structure and one or more photomultipliers.

The collimator is placed between an object that emits gamma radiation and the scintillation structure and has the function of allowing the passage only of the radiation directed perpendicularly to the scintillation structure screening all radiation directed perpendicularly to the scintillation structure shielding all radiation directed in different directions.

It should be noted that gamma radiation, composed of gamma photons, cannot be deviated by optical lenses (e.g. it takes place for the photons emitted in the visible range in traditional photography) because of their penetrating power and they also do not have electrical charge. The photon beam is then modulated by means of the collimator which acts shielding most of the emitted photons. The scintillation structure is constituted by a single planar crystal or by a plurality of crystals able to receive gamma photons and to transform them into photons in the visible range (light photons).

The photomultiplier is connected to the scintillation structure at the opposite side from that of the collimator through an appropriate optical connection and its function is to detect the light photons transforming their energy into an electrical signal that is amplified and carried towards the processing circuits to recreate the image of the radiation source.

The gamma camera is used in "imaging" systems for diverse applications, such as diagnostic applications (like PET, SPECT and conventional scintigraphies), in Astrophysics and in systems for industrial non-destructive tests. The intrinsic spatial resolution of the gamma camera depends, among other matters, on the dimensions of the crystals that compose the scintillation structure.

To improve the intrinsic spatial resolution of the gamma camera, scintillation structures have been developed which comprise a plurality of individual scintillation crystals with dimensions in the order of one millimeter, flanking each other (crystal matrices).

In a known method to obtain a scintillation structure that allows a high spatial resolution, so-called matrix structures are created, i.e. structures in which individual crystals in the form of rods are locked by means of epoxy resins whose function is to keep the crystals mutually linked and equidistant.

Consequently, said matrix structures are directly usable as scintillation structures.

As stated, the purpose of the scintillation structure is to convert the energy of the incident gamma photon into light photons.

In particular, for each gamma interaction a certain number of photons are emitted in the visible range, which number depends, as a first approximation, on the energy released by the incident gamma photon. Depending on the type of interaction, the energy release can be complete (photoelectric effect), or partial (Compton effect).

In the ideal case, the incident photon releases all its energy to the crystal and a perfect proportionality is maintained between the energy of the gamma photon and the intensity of the light that reaches the photomultiplier.

In reality, the gamma photon can interact with an electron of the crystal through the Compton effect undergoing a deviation from the original direction and depositing only a part of its energy. This process can be repeated, originating successive deviations. The diffused photon, though with less energy than the initial one, can traverse the dividing layer of epoxy resin and produce a new scintillation in neighboring crystals.

The same gamma photon can thus produce multiple scintillation points in neighboring crystals. In general, this entails an erroneous calculation of the position of the interaction of the gamma photon.

The individual interaction event between photon and crystal is seen by the electric device reading the collected signal as the sum of the energy contributions released into the crystals in the individual interactions. In general, the utilization electronics are based on the method of the charge barycenter recorded on the entire surface area of the crystal and consequently the final value of the recorded position includes all the interaction effects that occur in the crystal.

The probability that a Compton effect may take place in a crystal is in any case linked to the energy possessed by the primary photon that interacts with the scintillating material. For SPECT applications, this probability is low if referred to the low energies of the radio tracers used. As energy increases, instead, the probability becomes progressively higher, until reaching very high values for applications with 511 keV photons in PET applications.

A possible solution to the problem described above is provided in the document U.S. Pat. No. 6,734,430 which discloses a method for obtaining a collimator made of metallic material having a high atomic number that integrates the scintillation structure. In this, it is possible to achieve the attenuation of the gamma photons that may pass from one crystal element to the other, obtaining better results than those achieved with separating epoxy resins. Metals having high atomic number (and hence high density) are more difficult to traverse for gamma photons than epoxy resins.

In the collimator described in the aforementioned prior art document, the individual scintillation crystals are integrated in the channels of the collimator, in particular each individual crystal is separated from the other crystals of the matrix and inserted into the holes present at the base of the collimator.

However, because of obvious construction difficulties, the solution with a single collimation structure and integrated crystals does not allow an optimal machining of hygroscopic crystals which need to be completely isolated from the surrounding environment.

Moreover, the insertion of individual crystals into the collimation channels entails additional drawbacks linked to the need to anchor the individual crystals to prevent them from moving along the channels of the collimator.

Additionally, positioning each crystal in such a way that it is perfectly aligned to the channel in which it lies and that all the crystals are arranged with the respective walls oriented towards the photomultiplier to form a single plane, perfectly orthogonal to the channel of the collimator, is very difficult and it requires considerable resources.

DISCLOSURE OF THE INVENTION

In this context, the specific technical task of the present invention is to make available a method to provide a scintillation structure able to overcome the aforementioned drawbacks.

Within said technical task, an important object of the invention is to propose a method to obtain a scintillation structure that maintains the scintillation light produced within the crystal on which the gamma photon is incident.

An additional object of the present invention is to make available a method for obtaining a scintillation structure that assures a perfect mutual alignment of the scintillation crystals and a perfect orthogonality with respect to the photomultiplier.

Yet another object of the present invention is to propose a method for obtaining a scintillation structure that assures that all crystals are arranged with the respective walls oriented towards the photomultiplier to form a single plane.

A further object of the present invention is to make available a method for obtaining a scintillation structure that assures that each crystal cannot move with respect to the channels of a collimator.

The specified technical task and objects are substantially achieved by a method for obtaining a scintillation structure in accordance with one or more of the appended claims.

BRIEF DESCRIPTION OF THE DRAWINGS

By way of indicative and non limiting example, the description is now provided of a method for obtaining a scintillation structure in accordance with the present invention, in which:

FIGS. 6a, 6b, 6c, and 6d show some steps of a first variant of the method for obtaining the scintillation structure; and FIGS. 7a, 7b, 7c, 7d, 7e, 7f and 7g show some steps of a second variant of the method for obtaining the scintillation structure.

DESCRIPTION OF THE PREFERRED EMBODIMENTS

Figure 1:
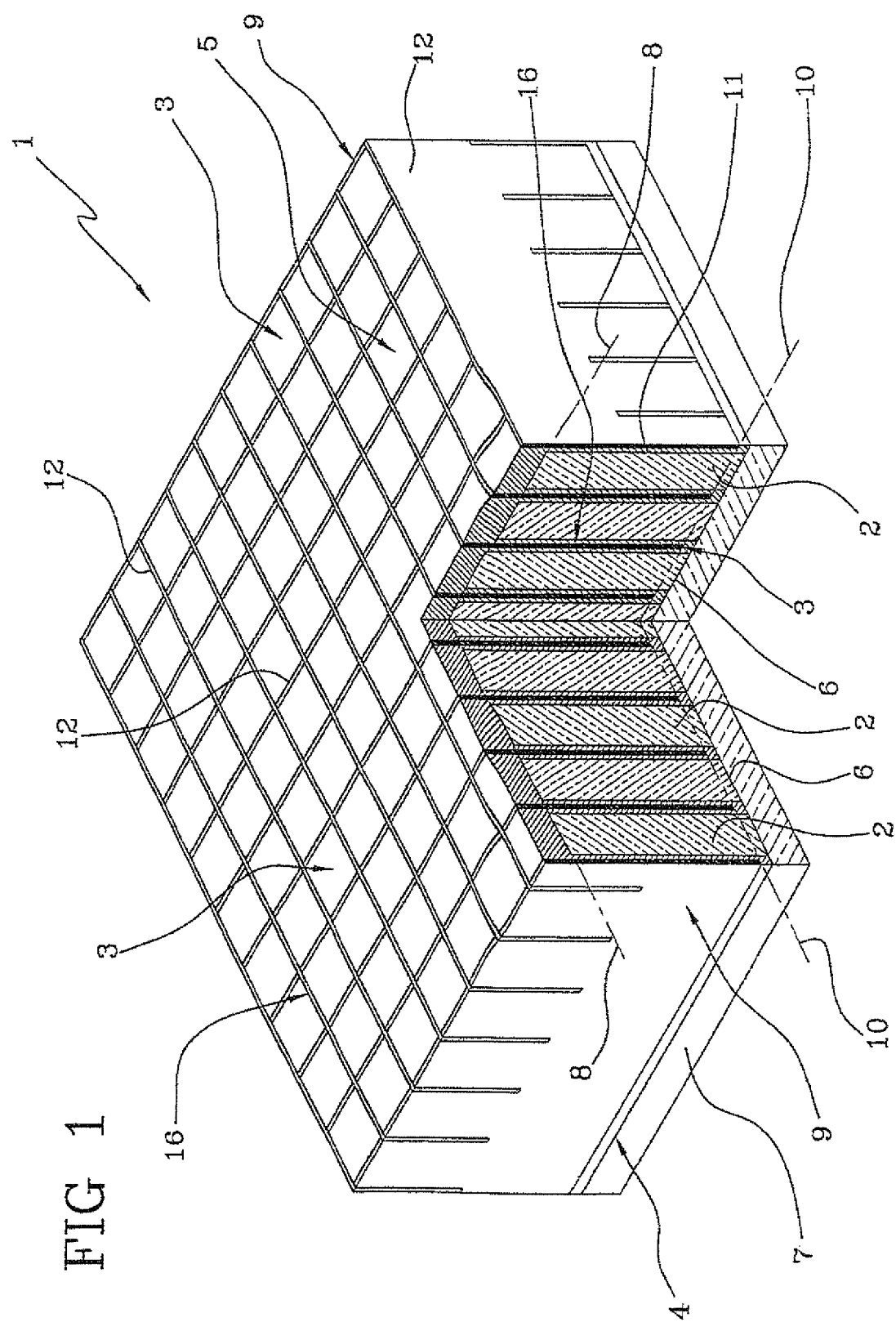
FIG. 1 shows a perspective, partially sectioned view of a scintillation structure in accordance with the present invention.

With reference to the accompanying figures, the reference number 1 designates in its entirety a scintillation structure according to the present invention.

The scintillation structure 1 is particularly suited to be used in a gamma chamber usable in different applications, such as Nuclear Medicine (SPECT and PET) in order to identify pathologies, perform the scintigraphic analysis of small animals to test radio-labeled new antibodies and peptides, astrophysics and industrial systems for non destructive tests.

The scintillation structure 1 comprises a plurality of scintillation crystals 2. The scintillation crystals 2 in the preferred embodiment illustrated in the accompanying drawing are shaped as a right prism with square base, however they can have any other prismatic shape.

The scintillation crystals 2 can be inorganic or organic, hyper-pure, or doped to enhance their scintillation properties according to the type of application to be obtained, to the diagnostic techniques and to the tracers used.

Moreover the scintillation crystals 2 can be hygroscopic, e.g. if the crystals are made of NaI(Tl), $LaCl_3$:Ce, $LaBr_3$:Ce, and non hygroscopic, e.g. if the crystals are made of CsI(Tl), BGO, LSO.

In any case, regardless of the type of scintillation crystal used, the emission spectrum of the scintillation light, i.e. of the light photons emitted by the crystals as a result of absorption of gamma rays, must have a good superposition with the absorption spectrum of a photosensitive layer of an electro-optical transducer to which the scintillation structure is coupled.

The scintillation structure moreover comprises a matrix of binding material within which are distributed the scintillation crystals 2. The binding material matrix 3 comprises epoxy resins or other reflecting (mirror) resins and its function is to keep the scintillation crystals 2 mutually joined in a predetermined position.

The matrix 3 comprises a base surface 4 and a top surface 5 opposite to the base surface 4. Said two surfaces are planar and mutually parallel, in such a way that the matrix 3 is a right prism.

The top surface 5 of the matrix 2 is destined to be coupled to a collimator (not shown) of a gamma camera, whilst the base surface 4 is destined to be coupled to an electro-optical transducer (not shown). In the preferred embodiment illustrated in the accompanying drawings, the matrix 3 is a right prism with square base.

The scintillation crystals 2 develop starting from the base surface 4 of the matrix 2 and they have respective walls 6 perfectly aligned to the base surface 4.

It should be noted that the walls 6 of the scintillation crystals 2 aligned to the base surface 4 of the matrix 3 are not covered by the material that comprises the matrix 3, so that the crystals 2 directly face the outside environment and can be coupled to an electro-optical transducer, e.g. a photomultiplier, to send to the latter light photons produced by the interaction between gamma rays and scintillation crystals.

In the case of hygroscopic crystals, as shown in FIG. 1, to the base wall 4 of the matrix is made integral a plate 7 made of material that is transparent to light radiation (i.e. within the emission spectrum of the scintillation crystals), to isolate the scintillation crystals 2 from the outside environment protecting them from humidity and simultaneously to allow a correct transmission of light photons to the electro-optical transducer. In the preferred embodiment, the plate 7 is made of glass.

The scintillation crystals 2 extend to an inner section 8 of the matrix of binding material 2 positioned in proximity to the top surface 5 thereof. It should be noted that the scintillation crystals 2 do not reach the top surface 5 and therefore they are completely coated by the material that composes it.

Between the scintillation crystals 2 is also present material that composes the matrix 3, so that the crystals 2 are mutually distanced.

The scintillation structure 1 further comprises metallic material 9, having a high atomic number and high density, positioned between scintillation crystals 2 to shield the crystals 2 at least partially between them.

Within the present invention, the term "metallic material having a high atomic number and high density" means a material made of metal or of an alloy of metals having a thickness, depending on the radioactive isotope used, that is able to prevent the passage of a gamma radiation.

Metallic materials suitable for this purpose are, for example, gold, palladium, platinum, platinum-iridium alloys, lead, tungsten, tungsten alloys or otherwise metals, or metal alloys, having atomic weight above 40.

Advantageously, the metallic material 9 is positioned between the scintillation crystals 2 in such a way that the crystals are mechanically bound to each other through the matrix 3 of binding material by a part of the scintillation structure destined to face the electro-optical transducer.

As shown in FIG. 1, the metallic material 9 traverses the top surface 5 of the matrix 3 of binding material and reaches, without going beyond, a first internal section 10 of the scintillation structure 1 positioned in proximity to the base surface 4.

In other words, the metallic material 9 goes beyond the top surface 5 of the matrix 3, destined to be associated to a collimator, and does not reach the base surface 4 of the matrix 3 destined to be associated to a photomultiplier. The metallic material 9 is positioned around the lateral walls 11 of each scintillation crystal 2 even though it does not completely surround said lateral walls 11. In particular, a small portion of the lateral walls 11 of the scintillation crystals 2 is not surrounded by the metallic material 9.

The portion of lateral wall of the scintillation crystals 2 not surrounded by the metallic material 9 is included between 25% and 12%, preferably between 16% and 4%, yet more preferably between 10% and 5%.

The fact that the metallic material 9 does not go beyond the first internal section 10 of the scintillation structure 1 assures that the binding material positioned between the first inner section 10 and the base surface 4 of the matrix 3 is not altered by the presence of the metallic material 9 and extends with continuity between adjacent scintillation crystals, mechanically fastening them to each other.

This enables not to separate the scintillation crystals 2 physically from each other when the metallic material 9 is inserted between the lateral walls 11 thereof, making the operation simple and assuring a perfect alignment of the crystals to each other.

It should be stressed that the matrix portion 3 not involved by the presence of metallic material 9 is the one destined to be coupled with the photomultiplier.

On the contrary, the matrix portion 3 destined to be coupled with the collimator is involved by the presence of metallic material 9 which mutually divides the lateral walls 11 of the scintillation crystals 2.

With this configuration it is possible to eliminate or anyway considerably attenuate the cross-talk phenomenon due to the Compton effect. As stated, the Compton effect is one of the possible interactions of the gamma photons with the scintillation crystals.

This effect consists of the transfer of part of the energy of the interacting gamma photon to an electron belonging to the material of the scintillation crystal. The gamma photon, however, can be deviated in such a way as to have a probability of continuing its travel with less energy, traverse the layer of binding material that divides a crystal from the adjacent crystal, and produce a new scintillation (emission of light radiation) in the adjacent crystals. The diffused photon can therefore produce multiple scintillation points in neighboring crystals, distorting the calculation of the interaction position. The presence of the metallic material 9 immediately downstream of the collimator prevents gamma photons deviated by a scintillation crystal from reaching the adjacent crystals.

The choice of the length of the crystal must be adequate to the mean scintillation plane (which in turn depends also on the energy of the radioisotope used). Since the metallic material 9 surrounds the lateral walls 11 of each crystal 2 almost to the end of the matrix 3, and in particular to the first inner section 10, there is a high probability that the diffused photons interact in the upper part of the crystal or are absorbed by the lateral foils before they reach the inner section 10. In other words, there is a high probability that the Compton interactions will exhaust themselves within the area of the crystal with which the gamma photon originally interacted because it is stopped by the metallic foils whereby it is surrounded.

This assures that for a diffused gamma photon it is statistically improbable to traverse the lateral walls 11 in the lower part of the section 10.

As shown in FIG. 1, the metallic material 9 is in the form of metallic foils 12 inserted between adjacent crystals to form a grating that surrounds, in the sense specified above, each individual scintillation crystal.

In an alternative embodiment not shown herein, the metallic foils 12 extend also beyond the top surface 5 of the matrix 3, forming a collimator that is integrated with the scintillation structure.

A method shall now be described for obtaining a scintillation structure in accordance with the present invention;

For the sake of clarity, reference shall explicitly be made to the scintillation structure described above.

However, as shall be readily apparent, the method described below may advantageously be employed to obtain scintillation structures having one or more differences with respect to the scintillation structure described above. The method for obtaining a scintillation structure comprises the step of readying the matrix 3 of binding material within which are present the scintillation crystals 2.

Between the crystals 2 is inserted the metallic material 9 having a high atomic number and high density (in the sense specified above).

Advantageously, the metallic material 9 is inserted between mutually adjacent scintillation crystals 2 without separating the scintillation crystals 2 from the matrix 3 of binding material.

In this way, the scintillation crystals 2 remain in their original position and it is not necessary to realign them with respect to each other and to the matrix 3 of binding material during the shielding of the crystals 2.

The metallic material 9 is inserted by first removing binding material positioned between mutually adjacent scintillation crystals 2, in such a way as to obtain a free space 13 (shown in FIG. 2) between the scintillation crystals 2, to house the metallic material 9.

The binding material can be removed, for example, by etching the matrix 3.

In particular, the binding material 3 is removed starting from the top surface 5 (the one destined to face a collimator) of the matrix 3, to the first inner section 10 of the matrix placed between the top surface 5 and the base surface 4 of the matrix 3, i.e. the surface whereon are aligned the walls 6 of the crystals 2 and destined to face the electro-optical transducer. In this way, a plurality of channels 14 are created for housing the metallic material 9 which will have to be inserted between the scintillation crystals 2.

As shown in the accompanying figures, the material of the matrix 3 is removed substantially perpendicularly relative to the top surface 5 of the matrix 3, in such a way as to obtain right grooves within the matrix, which allow an easy insertion of the metallic material 9 around each crystal 2.

With reference to the preferred embodiment of the present invention, the material of the matrix 3 is first removed between adjacent arrays 15 of scintillation crystals 2 to divide only partially the arrays from each other and subsequently it is removed in such a way as to separate only partially from each other the scintillation crystals 2 of a same array.

Figure 2:
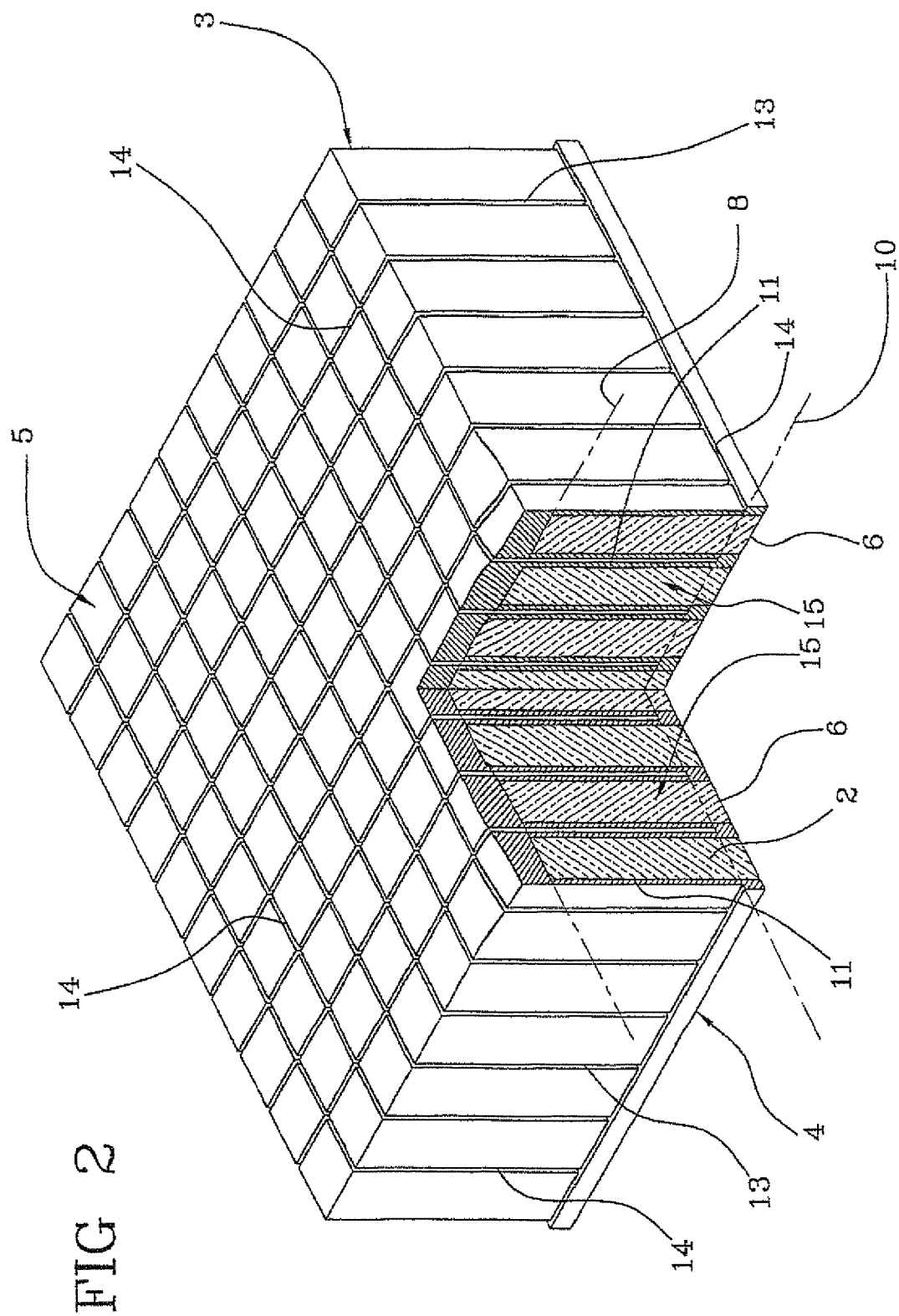
FIG. 2 shows a perspective view of a method for obtaining a scintillation structure in accordance with the present invention.

In particular, in the preferred embodiment in which the matrix 3 of binding material has prismatic shape with square base and the scintillation crystals 2 also have substantially prismatic shape with square base, the material of the matrix 3 is first removed along a first direction of alignment of the crystals 2 and, subsequently along a second direction, perpendicular to the first (see FIGS. 2 and 7).

In this way a matrix 3 is obtained having a plurality of housing channels 14 which partially divide all the scintillation crystals 2 from each other.

The step of inserting metallic material 9 comprises the preliminary step of constructing a metallic structure 16 comprising a plurality of housing seats 17 having walls aligned with the empty space, i.e. the housing channels 14, left in the matrix 3 of binding material.

The metallic structure 16 is then inserted into the empty space 13 obtained in the matrix 3 of binding material, as in the case of FIGS. 5 and 6a through 6d. Alternatively, the metallic structure is constructed directly within the matrix 3 of binding material, as in the case of FIGS. 7a through 7g.

The metallic structure 16, when inserted in the matrix 3 of binding material after its construction, can be obtained according in different manners.

Figure 3:
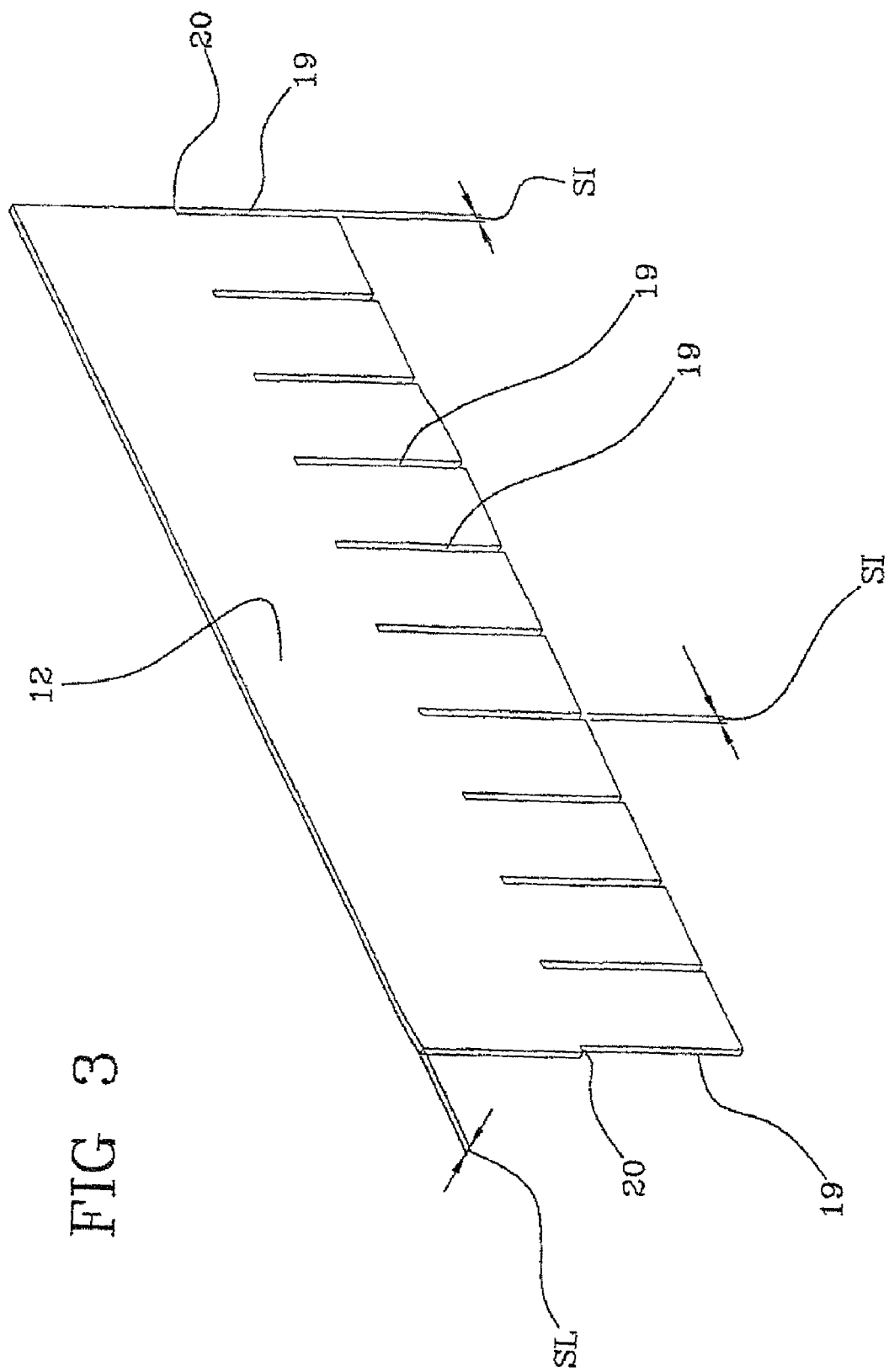
FIG. 3 shows a perspective view of an element used in the method for obtaining the scintillation structure.
Figure 4A:
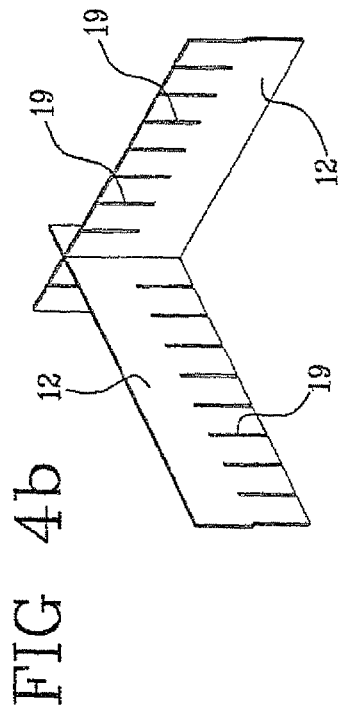
FIGS. 4a, 4b, 4c, 4d and 5 show some steps of the method for obtaining the scintillation structure.
Figure 4B:
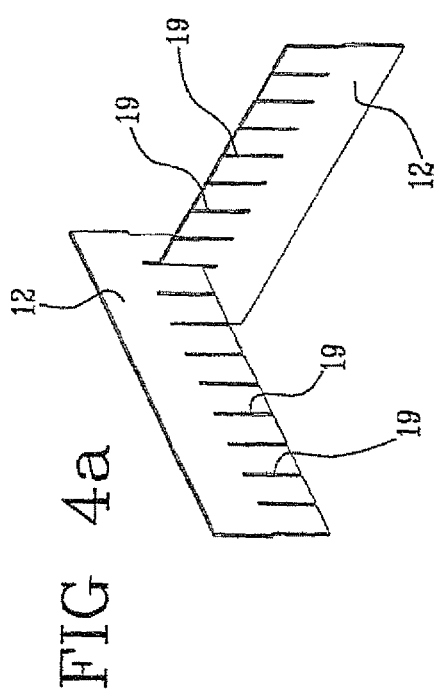
Figure 4C:
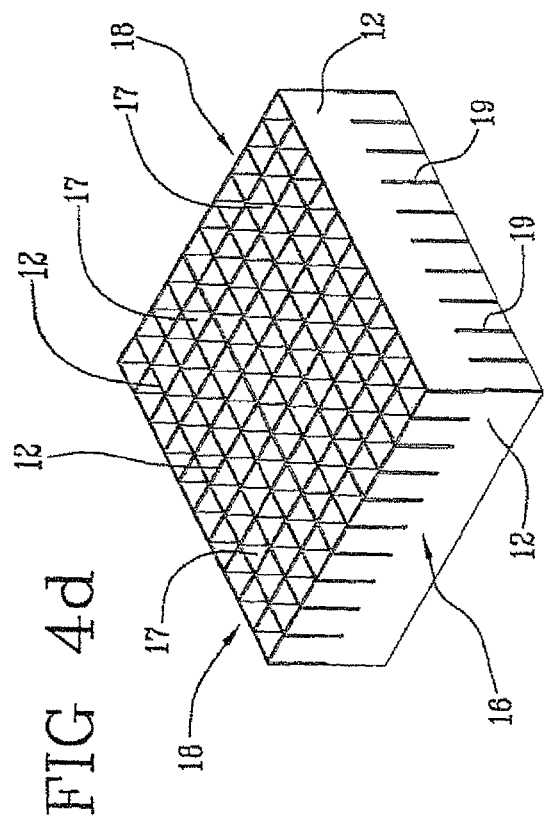
Figure 4D:
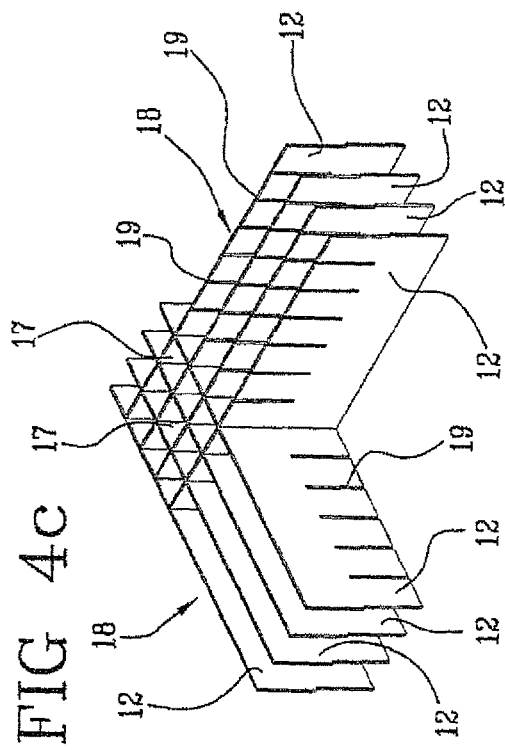
Figure 5:
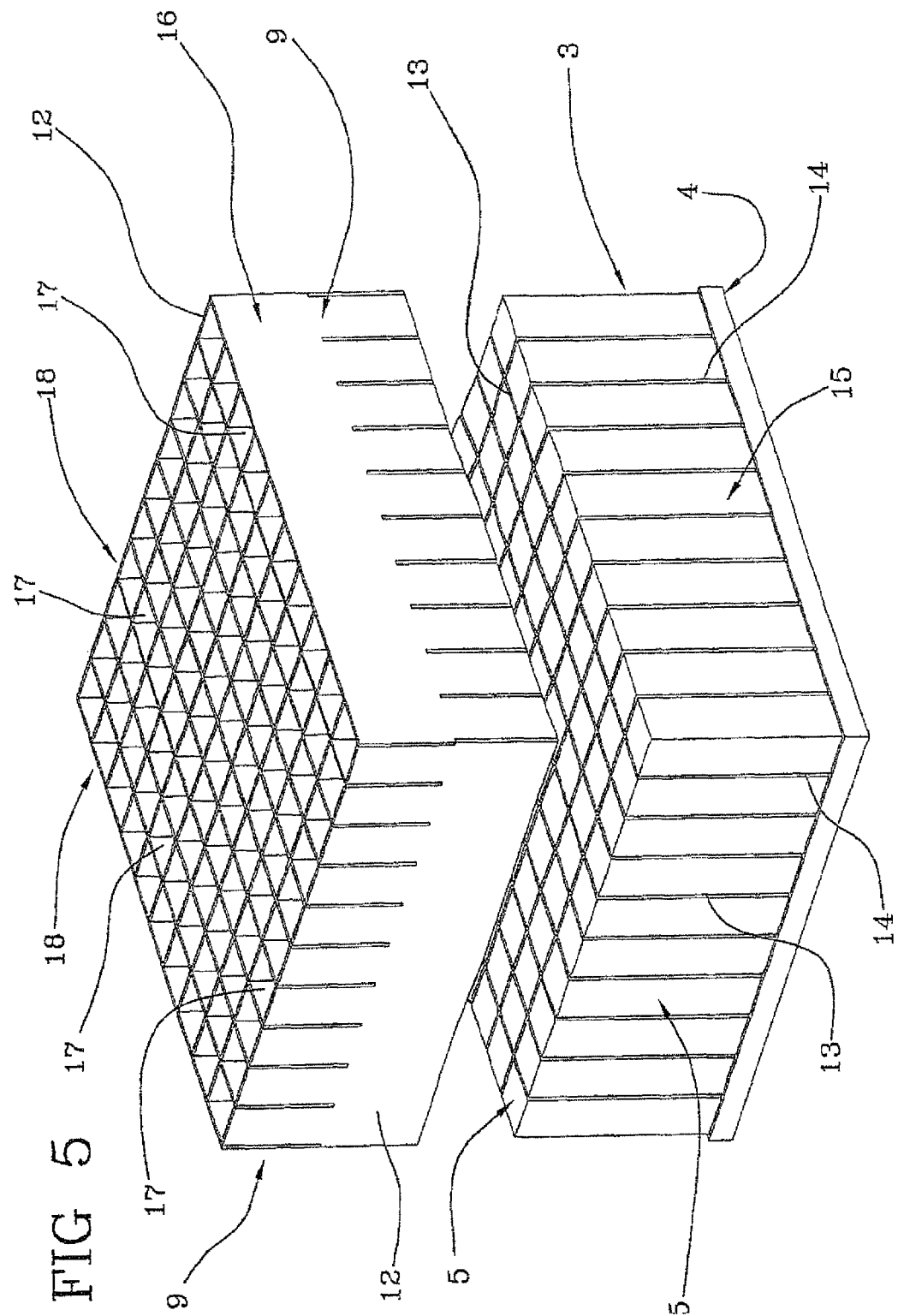

In a first embodiment, shown in FIGS. 3 through 5, the metallic structure 16 is obtained providing two arrays 18 of metallic foils 12 which are mutually bound.

In particular, each foil 12 of an array 18 is bound to each foil 12 of the other array, as shown in FIGS. 4c and 4d.

To bind together the foils 12 of different arrays 18, in each metallic foil 12 are obtained notches 19, transverse to a direction of development of the foil 12 itself. Each notch 19 of a foil engages a corresponding notch 19 of a foil 19 of the other array 18, as shown in FIGS. 4a and 4b.

The notches 19 are obtained in each foil 12 of the two arrays 18, their number is equal to the number of housing seats 17 plus one, and they extend for half of the dimension along a second direction of development of the foil 12 perpendicular to the first.

In the case of a scintillation structure like the one of the accompanying figures in which, for example, the matrix 3 contains 100 scintillation crystals arranged in 10 arrays of 10 elements each and each crystal has dimensions of 2.35 mm×2.35 mm base and 5 mm height (development from the base surface 4 of the matrix 3 to the second inner section 8).

The height of the matrix 3, i.e. the distance between the base surface 4 and the top surface 5 is 6 mm, and each base side of the matrix is 25.7 mm.

Therefore, the distance between a scintillation crystal 2 and the next is 0.22 mm. It should be stressed that the numeric examples indicated serve solely the purpose of better describing the work steps to obtain a scintillation structure according to the invention and are not to be construed in a limiting sense.

In the above numeric example, nine notches 19 are obtained on each foil 12, each notch having height of about 3 mm.

The number of foils used is twenty-two, i.e. eleven foils 12 for each array 18 of foils. Of these eleven foils, two are peripheral foils and nine are inner foils.

Each foil 12 has a thickness of 0.3 mm and each notch obtained on the foil has thickness of 0.2 mm.

It should be noted that, independently of the numeric example mentioned, all the foils 19 have the same thickness and that the thickness SI (see FIG. 3) of each notch 19 is identical to the thickness SL (see FIG. 3) of the foil 12.

The distance between two consecutive notches 19 on each foil 12 is equal to the distance between two consecutive scintillation crystals 2, which in the numeric example indicated is 2.22 mm.

In addition to the aforesaid nine notches 19, each foil 12 comprises two additional notches 19 positioned, each, at the end of the foil (see FIG. 3). These two additional notches 19 provide two shoulders 20 destined to engage the notches 19 of the foils 12 that will be placed on the edges of the matrix 3.

The foils 12, mutually identical, provided with the notches 19, are then subdivided in two arrays.

The foils 12 of one array are rotated by 180° relative to the blades 12 of the other array and are then mutually engaged along the notches 19 (see FIG. 4a).

Note that the metallic foils 12 that will constitute the edges of the scintillating structure, i.e. those that engage the aforesaid shoulders 20, are applied by pressure to the metallic structure 16 being formed, possibly fastened with glue to enhance the strength of the structure.

Following the method described above, a metallic structure 16 is obtained that is solid, cohesive, and that bears a plurality of housing seats 17, whose number is exactly equal to the number of scintillation crystals 2 present in the matrix 3.

It should be stressed that the housing channels 14 for the metallic foils 12 do not reach the base surface 4 of the matrix 3 wherefrom, as stated, the crystals 2 develop.

Alternatively, the metallic structure 16 is obtained by removing metallic material from a metallic block (see FIGS. 6a through 6d).

In particular, a block of material with high atomic number is used, having a hardness that allows its mechanical machining with tools such as milling cutters, drills and the like.

The method entails readying a plurality of circles 21 (FIG. 6b) on an upper surface 22 of a block of metallic material. Each circle 21 is included within each space that will delimit a housing seat 17.

Material is then removed from the metallic block, obtaining a plurality of through holes that are the projection of the circles 21.

This operation can for example be performed with a tool such as a drill or a milling cutter.

Subsequently, material is removed in such a way as to give the circular holes a shape suitable to contain and separate the scintillation crystals 2. In the illustrated example, the circular holes are made square.

This removal of material can be performed using precision processes with electron discharge machining wires. Machining the block enables to obtain a stable structure, with no need for additional machining.

The block thus machined (FIG. 6c) is subsequently sectioned along planes perpendicular to the axis of the drilled holes, in such a way as to obtain metallic structures 16 having predetermined height (FIG. 6d).

The advantage of this method consists of the possibility to obtain such heights of the metallic structure 16 that they can be used directly also as collimators integrated with the scintillating structure, e.g. in the applications of variable collimators that use many separate blocks having small height as described in Italian patent application RM2004A000271.

The method for obtaining the metallic structure 16 described above is faster than the one described previously, with an increase in the waste material resulting from the machining. If low-cost material is used (tungsten alloys between 75% and 90% with copper or nickel), said machining is any case highly competitive in terms of production costs.

Regardless of the manner whereby the metallic structure 16 is obtained, said structure is inserted by "rabbet-joining", i.e. with slight interference within the matrix 3, assuring a stable union between these two elements and hence between the scintillation crystals 2 and the metallic structure 16.

To assure an even more effective union, the walls of the metallic structure 16 can be coated at least partially by a glue.

Regardless of the choice of metallic structure 16 between the two described ones, it is possible to eliminate or anyway considerably attenuate the cross-talk phenomenon due to the Compton effect. As stated, the Compton effect is due to the interaction of the gamma photons with each scintillation crystal.

This effects consists of the transfer of part of the energy of the interacting gamma photon to an electron belonging to the material of the scintillation crystal. The gamma photon, after this interaction, as explained above, has less energy and different direction from the original one. This entails a high probability of traversing the layer of binding material that divides a crystal from the adjacent crystal, and of producing a new scintillation (emission of light radiation) in the adjacent crystals. The diffused photon can thus produce multiple scintillation points in neighboring crystals, distorting the calculation of the position of interaction.

The presence of the metallic structure 16 immediately downstream of the collimator prevents gamma photon deviated by a scintillation crystal from reaching the adjacent crystals.

Since the metallic material 9 surrounds the lateral walls 11 of each crystal 2 almost to the end of the matrix 3, and in particular to the first inner section 10, there is a high probability that the diffused photons will interact with other electrons of the crystal and expend their energy before reaching the first inner section 10 of the matrix.

In other words, there is a high statistical probability that all Compton effects will be exhausted within the area of the crystal that the gamma photon originally hit, or on the foils adjacent thereto.

This assures that, in statistically significant fashion, a gamma photon incident on a crystal does not cause scintillation in the adjacent crystals because it is stopped by the metallic foils whereby it is surrounded.

Moreover, advantageously, the metallic structure 16 can be inserted and fastened with considerable ease and precision in the matrix 3 of binding material and assure that each scintillation crystal 2 remains exactly aligned with the other crystals and aligned with the metallic structure 16.

In an additional embodiment, shown in FIGS. 7a through 7g, the metallic foils 12 are inserted in the empty spaces 13 left in the matrix of binding material as a result of the removal of material positioned between adjacent crystals 2.

Figure 7A:
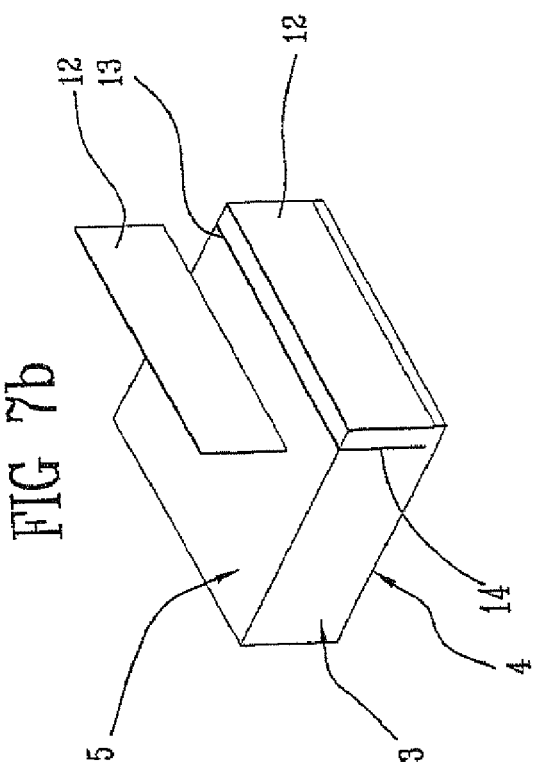
Figure 7B:
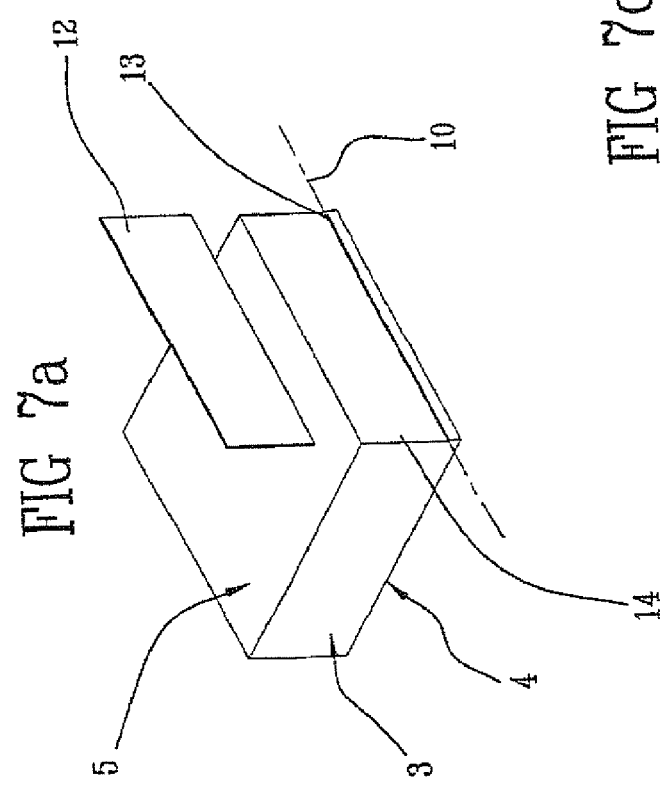

In particular, as shown in FIGS. 7a and 7b, at first material of the matrix 3 is removed only between two adjacent rows of scintillation crystals 2 or from an edge of the matrix 3 of binding material.

Subsequently, a first foil 12 is inserted in the empty space 13, i.e. in the channel 14 made available, between two arrays 15 of scintillation crystals 2. The operation is repeated until all the foils 12 are inserted between two adjacent and parallel arrays of crystals 2.

Figure 7C:
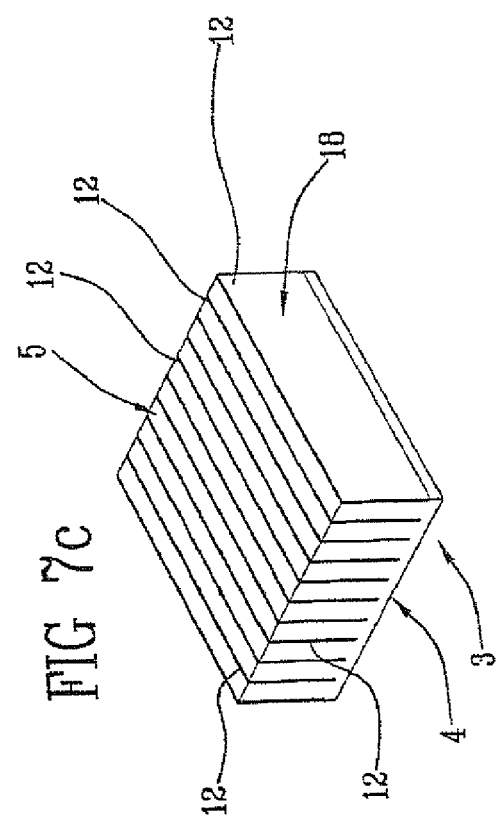

Alternatively, it is possible to remove first the material of the matrix 3 between adjacent and parallel arrays of scintillation crystals 2 (as in the two methods described above) and subsequently to insert foils 12 in the channels 14 which have become available. Regardless of the choice between the two options, the difference between this alternative form and the methods already described is that foils 12 are inserted that are not mutually bound in mutually parallel channels obtained in the matrix 3 between arrays 18 of adjacent crystals 18, as shown in FIG. 7c.

Subsequently, additional channels 14 are obtained perpendicularly to those already obtained and already filled with metallic material 9.

It should be stressed that these additional channels 14 are obtained removing both the material of the matrix 3 of binding material and the metallic material 9 already introduced, in such a way as to obtain a plurality of notches 19 in the foils 12 already inserted.

The additional channels 14 are obtained in such a way that the material (both of the matrix 3 of binding material and of the foils 12 already inserted) is removed starting from the top surface 5 (the one destined to face a collimator) of the matrix 3, to the first inner section 10 of the matrix positioned between the top surface 5 and the base surface 4 of the matrix 3, i.e. the surface whereon are aligned the walls 6 of the crystals 2 and destined to face the electro-optical transducer.

Hence, once again, the scintillation crystals 2 are not separated from the matrix 3 of binding material.

It should also be noted that the notches 19 involve all the foils 12 of the first array and provide a plurality of empty spaces 13 for the insertion of a second array 18 of foils 12.

The foils 12 already inserted are then divided in a plurality of foils by the notches 19 that extend throughout the height development of the foils 12.

The second array of foils 12 is then inserted perpendicularly to the first (FIGS. 7d and 7f) obtaining a metallic structure 16 directly within the matrix 3.

Metals with high atomic number, suitable for use, are for example lead, goal, and any other easily workable material.

To assure that the metallic structure 16 thus obtained remains stably united within the matrix 3, a layer of binding material is applied above the scintillating structure, to bury the metallic structure 16 within the matrix.

It should be noted that the blades 12 that are to be positioned along the edges of the matrix 3 can be preventively coated, at least partially, with glue in such a way as to adhere to the surface of the matrix 3.

In this case, the foil 12 is not completely housed between two arrays 18 of crystals 2 but is only facing an array 18 of crystals 2.

The fact that the scintillation crystals 2 are not, even in this case, completely surrounded by the metallic material does not significantly influence (as stated above) the performance of the scintillation structure.

It should also be stressed that the described method, in all its variants, can be implemented to obtain both scintillation structures having non hygroscopic crystals 2 and scintillation structures having hygroscopic crystals 2, because any working step does not involve the base structure 4 of the matrix which, in the case of hygroscopic crystals, is preventively coated by a layer of glass to isolate the crystals 2 from the outside environment.

What is claimed:

1. A method for obtaining a scintillation structure comprising the step of readying a matrix of binding material within which is present a plurality of scintillation crystals, wherein metallic material having high atomic number and high density is inserted between mutually adjacent scintillation crystals without separating the scintillation crystals from the matrix of binding material and wherein the step of inserting the metallic material is preceded by the step of removing binding material positioned between mutually adjacent scintillation crystals, to obtain a free space between said scintillation crystals, destined to house said metallic material, wherein the binding material is removed from a top surface of the matrix, destined to face a collimator, to a first internal section of the matrix positioned between said top surface and a base surface of the matrix whereon are aligned planar walls of the crystals and destined to face an electro-optical transducer, and wherein the binding material positioned between said first inner section and said base section of the matrix mechanically joins said scintillation crystals together.

2. Method as claimed in claim 1 wherein the material of the matrix is removed substantially perpendicularly to a top surface of the matrix in such a way as to obtain channels within the matrix.

3. Method as claimed in claim 1, wherein the material of the matrix is first removed between adjacent arrays of scintillation crystals to divide only partially said arrays from each other and subsequently it is removed in such a way as to separate only partially from each other the scintillation crystals of a same array.

4. Method as claimed in claim 1, wherein the step of inserting metallic material comprises the preliminary step of constructing a metallic structure comprising a plurality of housing seats having walls aligned with the free space left empty in the matrix of binding material as a result of the removal of material positioned between adjacent crystals; said metallic structure being inserted in said free space obtained in the matrix of binding material.

5. Method as claimed in claim 4, wherein the step of constructing a metallic structure comprises the steps of readying two arrays of metallic foils and to join each foil of an array to all the foils of the other array.

6. Method as claimed in claim 5, wherein in each metallic foil are obtained notches transverse to a first direction of development of the foil itself; a notch of each foil of an array engaging a notch of a foil of the other array.

7. Method as claimed in claim 6 wherein said notches are obtained in each foil of the two arrays; the number of said notches being equal to the number of housing seats plus one and extending for half of the dimension along a second direction of development of the foil perpendicular to the first direction of development of the same foil.

8. Method as claimed in claim 7 wherein two of said notches on each foil involve the edges thereof obtaining two lateral shoulders destined to engage notches of a foil of the other array.

9. Method as claimed in claim 4, wherein said housing seats of the metallic structure are obtained by removing material from a block of said metallic material.

10. Method as claimed in claim 1, wherein the step of inserting metallic material comprises the steps of inserting metallic foils into free spaces obtained in the matrix of binding material as a result of the removal of material positioned between adjacent crystals.

11. Method as claimed in claim 10, wherein a first array of metallic foils are inserted between adjacent arrays of scintillation crystals to divide only partially said arrays from each other; a second array of foils being subsequently inserted in such a way as to separate only partially from each other the scintillation crystals of a same array.

12. Method as claimed in claim 11, comprising, subsequently to the step of inserting the first array of foils, the step of obtaining a plurality of notches in the inserted foils and in the matrix of binding material; each of said notches involving all the foils of the first array to obtain a plurality of free spaces for the insertion of said second array of foils.

13. Method as claimed in claim 11, wherein said notches in each foil of the first array extend along its entire development dividing it into a plurality of foils.

14. Method as claimed in claim 13, comprising the step of pouring a layer of binding layer above the scintillating structure after the step of inserting of the second array of foils to set stably the metallic material in the assumed position.

15. Scintillation structure comprising a matrix of binding material, a plurality of scintillation crystals distributed within the matrix of binding material, and a metallic material positioned between scintillation crystals to shield at least partially from each other the crystals, wherein said matrix of binding material comprises a top surface destined to face a collimator and a base surface opposite to the top surface destined to face the electro-optical transducer; said top surface completely coatings said scintillating crystals; said crystals having respective walls coplanar to, and not covered by, said base surface, wherein said metallic material is positioned between said scintillation crystals in such a way to traverse said top surface of the matrix of binding material and reach, without overshooting, a first inner section of the scintillation structure positioned in proximity to said base surface and wherein said scintillation crystals extend between said base surface and a second inner section of the scintillation structure positioned in proximity to said top surface, wherein the binding material positioned between said first inner section and said base section of the matrix mechanically joins said scintillation crystals together in such a way that said crystals are mechanically joined to each other through said matrix of binding material by a part of said matrix of binding material positioned in proximity to said base surface, wherein said scintillation crystals are hygroscopic crystals and wherein the scintillation structure further comprises a plate of material that is transparent to light radiation positioned in contact with a base surface of the matrix of binding material and made integral to the base surface of the matrix to isolate said scintillation crystals from the outside environment.

16. Scintillation structure comprising a matrix of binding material, a plurality of scintillation crystals distributed within the matrix of binding material, and a metallic material positioned between scintillation crystals to shield at least partially from each other the crystals, wherein said matrix of binding material comprises a top surface destined to face a collimator and a base surface opposite to the top surface destined to face the electro-optical transducer; said top surface completely coating said scintillating crystals; said crystals having respective walls coplanar to, and not covered by, said base surface, wherein said metallic material is positioned between said scintillation crystals in such a way that said crystals are mechanically joined to each other through said matrix of binding material by a part of said matrix of binding material positioned in proximity to said base surface, wherein said metallic material traverses said top surface of the matrix of binding material and reaches, without overshooting, a first inner section of the scintillation structure positioned in proximity to said base surface; wherein said scintillation crystals extend between said base surface and a second inner section of the scintillation structure positioned in proximity to said top surface; and wherein the binding material positioned between said first inner section and said base section of the matrix mechanically joins said scintillation crystals together.

* * * * *